United States Patent [19]

Barraud

[11] Patent Number: 4,852,155
[45] Date of Patent: Jul. 25, 1989

[54] SYSTEME D'AUTHENTIFICATION ANALOGIQUE RECIPROQUE ENTRE UN TERMINAL ET UNE LIGNE DE TRANSMISSION

[75] Inventor: Claude Barraud, Paris, France
[73] Assignee: Schlumberger Industries, Montrouge, France
[21] Appl. No.: 181,605
[22] Filed: Apr. 14, 1988
[30] Foreign Application Priority Data
 Apr. 17, 1987 [FR] France ................................ 87 05503
[51] Int. Cl.[4] ............................................ H04M 1/66
[52] U.S. Cl. ...................................... 379/145; 379/189
[58] Field of Search ................. 379/27, 145, 155, 154, 379/189; 194/202; 380/30

[56] References Cited

U.S. PATENT DOCUMENTS 4,625,078 11/1986 Crouch et al. ...................... 379/145

Primary Examiner—Stafford D. Schreyer
Attorney, Agent, or Firm—Sanford J. Asman

[57] ABSTRACT

The invention relates to a system for mutual authentication between a transmission line and a terminal, e.g. a prepayment telephone set.

The telephone (2) is connected to the line (14) via a monitoring device (18). Electronic circuits (18) and (12) are associated with the monitoring device and with the telephone in order to generate authentication frequency signals throughout the call at inaudible frequencies.

21 Claims, 4 Drawing Sheets

SYSTEME D'AUTHENTIFICATION ANALOGIQUE RECIPROQUE ENTRE UN TERMINAL ET UNE LIGNE DE TRANSMISSION

The present invention relates to a system for mutual analog authentication between a terminal and a transmission line.

More precisely, but not exclusively, the invention relates to such a system applied to an indoor pre-payment telephone set, i.e. a telephone installed on private premises and for which call charges are paid by means of coins or memory cards. The invention is particularly advantageous when call charging is not performed by counting meter pulses transmitted from the telephone exchange, but is performed by immediate pre-payment by the user. It will be understood that in this case, it is necessary to make it possible for the pre-payment telephone to be replaced by an ordinary telephone, thereby enabling telephone calls to be obtained dishonestly for free.

More generally, the invention applies to any case where it is necessary to establish mutual authentication between a telephone terminal or the like and a transmission line (physical or radio) prior to authorizing information interchange.

The following solution has been proposed for solving this problem: during the initial stage of setting up a telephone call, coded magnitudes are interchanged between the transmitter and the receiver in order to control access to the call.

Such a system solves the problem only partially. Proposals have also been made to encode the information to be transmitted at the transmitter and to decode it symmetrically at the receiver. However, since information is transmitted in the form of analog frequency signals, the encoding and decoding operations are relatively complex.

In order to remedy this drawback, an object of the invention is to provide such a mutual authentication system which can be used to monitor call authorization throughout the duration of the call and which is additionally compatible with information being transmitted in the form of analog frequency signals, and which finally makes it possible to counter all kinds of attempted fraud, including recording the signals interchanged during preceding calls.

According to the invention, this object is achieved by a system for authenticating a call by analog frequency signals lying in a first or data range of frequencies between a transmitter/receiver terminal and a communications line, the system being characterized in that it further includes a monitoring device connected in said line, and in that:

said terminal includes means for generating authentication frequency signals in addition to said communications signals with a periodicity T while a call is in progress, said authentication signals having frequencies lying in a second frequency range, said authentication signals comprising, for each period, a fixed first signal $f_1^i$ characteristic of said terminal, and a variable second signal $f_2^i$;

said terminal and said monitoring device each including means for interchanging a first common value $K_1$ in the form of frequencies prior to a call being set up, means for implementing a common algorithm for generating respective second frequency values $f_2^i$ and $f'_2^i$ at each period T and depending at least on the preceding second frequency value, respectively $f_2^{i-1}$ and $f'_2^{i-1}$;

said termial further including means for emitting said frequencies $f_1^i$ and $f_2^i$ at each period; and said monitoring device further including means for comparing each first frequency $f_1^i$ with predetermined first frequency values, and for comparing each received second frequency $f_2^i$ with the corresponding calculated second frequency $f'_2^i$, over a predetermined approximation range corresponding to line transmission, and means for inhibiting said call as a function of the results of said comparisons.

It will be understood that such a system satisfies the conditions laid down. Since the authentication signals are transmitted periodically, authentication is performed throughout the duration of information transmission. The first authentication frequency signal serves to identify the transmitter/receiver terminal. The initial interchange between the monitoring device and the terminal of the first common initial value $K_1$ prior to a call being set up serves to perform mutual authentication.

Other characteristics and advantages of the invention appear more clearly from reading the following description of an embodiment of the invention given by way of non-limiting example. The description refers to the accompanying drawing, in which.

Figure 1:
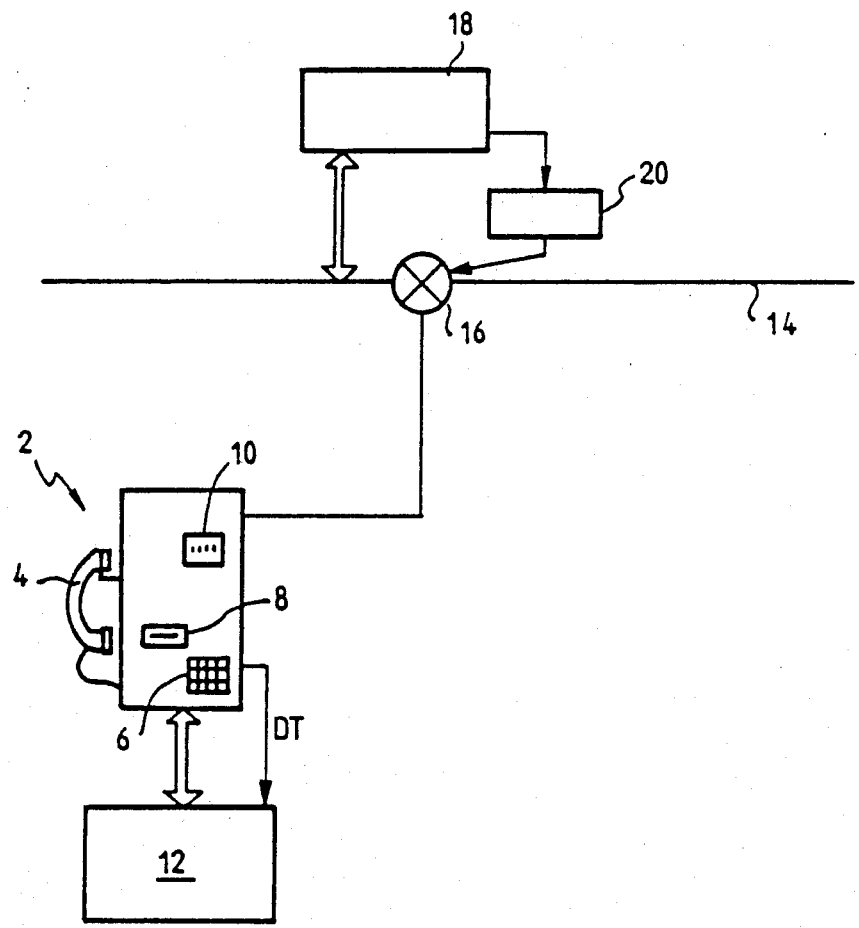
FIG. 1 is a simplified view of an authentication system for a telephone set in accordance with the invention.

The principle of the invention is described initially with reference to FIG. 1. In conventional manner for pre-payment telephones the terminal, which is a telephone set 2 in the present description, comprises a handset 4, a telephone dialling keypad 6, a memory card reader 8, and a display device 10.

FIG. 1 also shows a circuit 12 connected to the remainder of the circuits of the telephone 2 and containing the circuits specific to the authentication function at the telephone 2. FIG. 1 also shows a telephone line 14 connected by a connection 16 to the telephone 2. FIG. 1 also shows a monitoring device 18 which is connected to the line 14 and which is suitable for controlling an inhibit device 20 which is capable of interrupting the transmission of information over the line, or of making it inaudible.

Throughout the duration of a telephone call, the monitoring device 18 interchanges information with the telephone 2 in the form of very low level signals (e.g. −50 dB) at frequencies which are not audible by the human ear.

The telephone 2 transmits a pair of frequencies: $f_1^i$ and $f_2^i$, at fixed periods T, for example once every two seconds.

The frequencies $f_1^i$ are always the same and serve to identify the telephone 2. The frequencies $f_2^i$ change each time a new pair of frequencies is transmitted from the telephone.

The problem to be solved is due, in part, to the fact that the usable frequency range is limited, for example from 25 kHz to 35 kHz, and that there exists a degree of uncertainty concerning the frequency actually generated by the telephone and the frequency actually decoded by the monitoring device 18. This uncertainty may be assumed to be ±5 Hz. This means that there are only about 1,000 different frequencies that can be distinguished in the above-defined frequency range, i.e. about 1,000 different items of information.

However, in order to obtain effective authentication, it is preferable to use the following method:

the frequency $f_2{}^n$ is defined as follows:

$$f_2{}^{n+1} = ALG1(K_n, f_2{}^n) \bmod(10^4) + 25 \text{ kHz, thus}$$
$$n N^* f_2{}^n [25 \text{ kHz}, 35 \text{ kHz}]$$

with the uncertainty on $f_2{}^n$ being non-cumulative since ALG1 is stochastic in frequency.

The initial values $K_n$ are defined as follows:

$$K'_{n+1} = ALG2(K'_n, f_2{}^1)$$

where ALG2 is such that:

$$K'_{n+1} > K'_n \text{ and } K_n = K'_n \bmod(D)$$

In addition, the following are defined:
 X is a 64-bit prime number public key;
 D is a 96-bit prime number public key;
 E1 is a 64-bit random number generated by the telephone; and
 E2 is a 64-bit random number generated by the monitoring circuit.

The circuit 12 in the telephone 2 performs the following calculation (RSA code):

$$Y = X^{**}E1 \bmod(D)$$

while the monitoring circuit 18 performs the following calculation:

$$Z = X^{**}E2 \bmod(D).$$

It is well known how to implement the RSA public key code. Further details can be obtained by referring to U.S. Pat. No. 4,405,829.

The telephone 2 and the monitoring circuit 18 interchange Y and Z, thereby enabling each of them to calculate a first common initial value:

$$K_1 = Z^{}E1 \bmod(D), \text{ and } K_1 = Y^{}E2 \bmod(D)$$

Simplified practical operation of the system is as follows:

Prior to setting up a telephone call, the numbers Y and Z are generated and interchanged in the form of frequencies.

Y and Z are preferably transmitted as follows:

Y and Z each comprise 96 bits, giving 32 digits in the range 0 to 7 or 8 numbers each comprising 4 digits going from 0 to 7.

Formally the following can be written: $Y = n_1, n_2, \ldots, n_8$, where $n_i \text{ i } [1,8]$ are numbers having four digits lying between 0 and 7.

The following can then be written:

$$Y_i = (n_i + 25,000) \text{Hz.}$$ Y is thus transmitted by transmitting eight frequencies $Y_1$ to $Y_8$.

In this way, the telephone 2 and the monitoring circuit 18 will both generate the first initial value $K_1$. In addition, each of them stores the algorithms ALG1 and ALG2.

When a telephone call is set up, the telephone transmits its characteristic frequency $f_1{}^1$ and draws the frequency $f_2{}^1$ at random. The monitoring device 18 verifies that the frequency $f_1{}^1$ is correct and stores the frequency $f_2{}^1$.

On the basis of $f_2{}^1$ and $K_1$, the telephone 2 and the monitoring device 18 respectively generate the frequency $f_2{}^2$ and the frequency $f'_2{}^2$. The frequency $f_2{}^2$ is transmitted to the monitoring device 18 two seconds after the frequency $f_2{}^1$. The monitoring device verifies that the transmitted frequency $f_2{}^2$ is indeed equal to the value $f'_2{}^2$ which it has calculated. If that is indeed the case, then the telephone call continues with second frequencies $f_2{}^3 \ldots f_2{}^n$. Otherwise, the inhibitor circuit 20 generates white noise on the line 14 thus making the telephone 2 completely unusable. In actual fact, as explained in greater detail below, the comparison is performed over a range of approximation which corresponds to the accuracy which can be expected from the frequency generator circuit, from the transmission line, and from frequency decoding on reception. This range of approximation is typically ±5 Hz.

It will be understood from reading the above description that the system in accordance with the invention can avoid all kinds of attempted fraud. Since the first initial value $K_1$ is different for each call, and since this value is used in defining the successive values of the second frequencies, it is not possible to attempt the fraud of recording the values of the second frequencies during a normal communication and reusing the recorded values during a fraudulent call. Similarly, since each value of the second frequency depends on the corresponding initial value $K_n$, the probability that the algorithm ALG1 will generate identical values for the second frequencies is substantially zero, thereby preventing another type of fraud.

Figure 2:
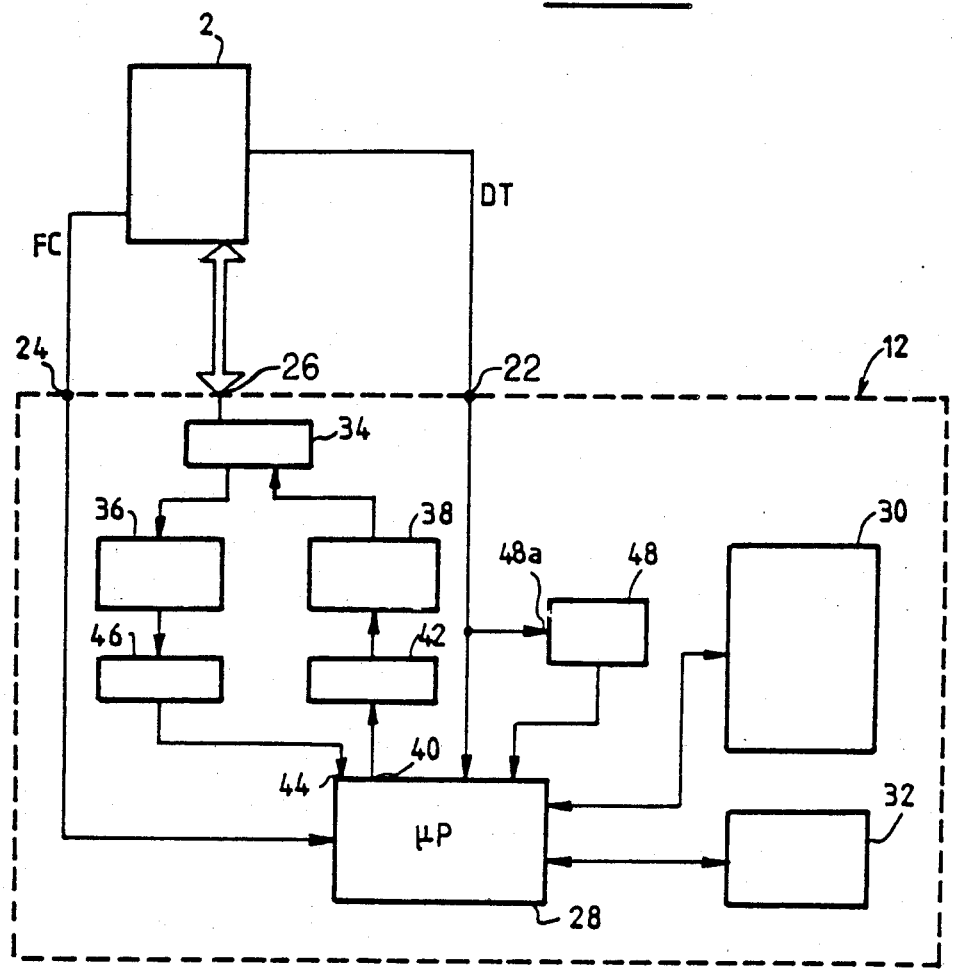
FIG. 2 shows the authentication circuit associated with the telephone set.

Reference is now made to FIG. 2 for describing in detail the circuit 12 of the telephone 2 for implementing the authentication procedure. The circuit 12 has an input 22 for receiving a signal DT marking the beginning of call charging. The circuit 12 also has an input 24 receiving a signal FC marking the end of a call. Finally, it has an input 26 on which it receives the frequency signals received by the circuits of the telephone 2. The circuit 12 is essentially constituted by a microprocessor 28 associated with a program and fixed data memory 30 and a writable volatile memory 32. For example, the memory 30 may be a PROM and the memory 32 a RAM. The circuit 12 also includes interface and synchronizing circuits. More precisely, it includes a filter 34 connected to the input 26. The filter 34 serves to pass only those frequencies which lie in the range of frequencies used for authentication signals, i.e. typically, in the range 25 kHz to 35 kHz. The filter 34 is connected firstly to a frequency analyser 36 and secondly to a frequency generator 38. Output 40 from the microprocessor 28 is connected to the control input of the frequency generator 38 via an encoding circuit 42.

Symmetrically, input 44 of the microprocessor 28 is connected to the output from the frequency analyser 36 via a decoding circuit 46. Finally, the circuit 12 includes a synchronizing circuit 48 having a control input 48a which receives the beginning of call charging signal applied to the input 22 of the circuit 12. The synchronizing circuit 48 serves to emit an initializing pulse on receiving the signal DT, and then to emit clock signals at a period T after an initial period $t_0$ running from reception of the signal DT.

The memory 30 essentially includes instructions and program elements for implementing algorithms ALG1 and ALG2, for implementing the RSA public key encoding program, for generating the initial value $K_1$, and further instructions for enabling the program described below to run properly. The memory 32 is used for performing and storing intermediate results corresponding to the implementation of the various algorithms, and also for storing the various values of the frequencies $f_2^1$ and the various values of the coefficients $K_i$.

Figure 3:
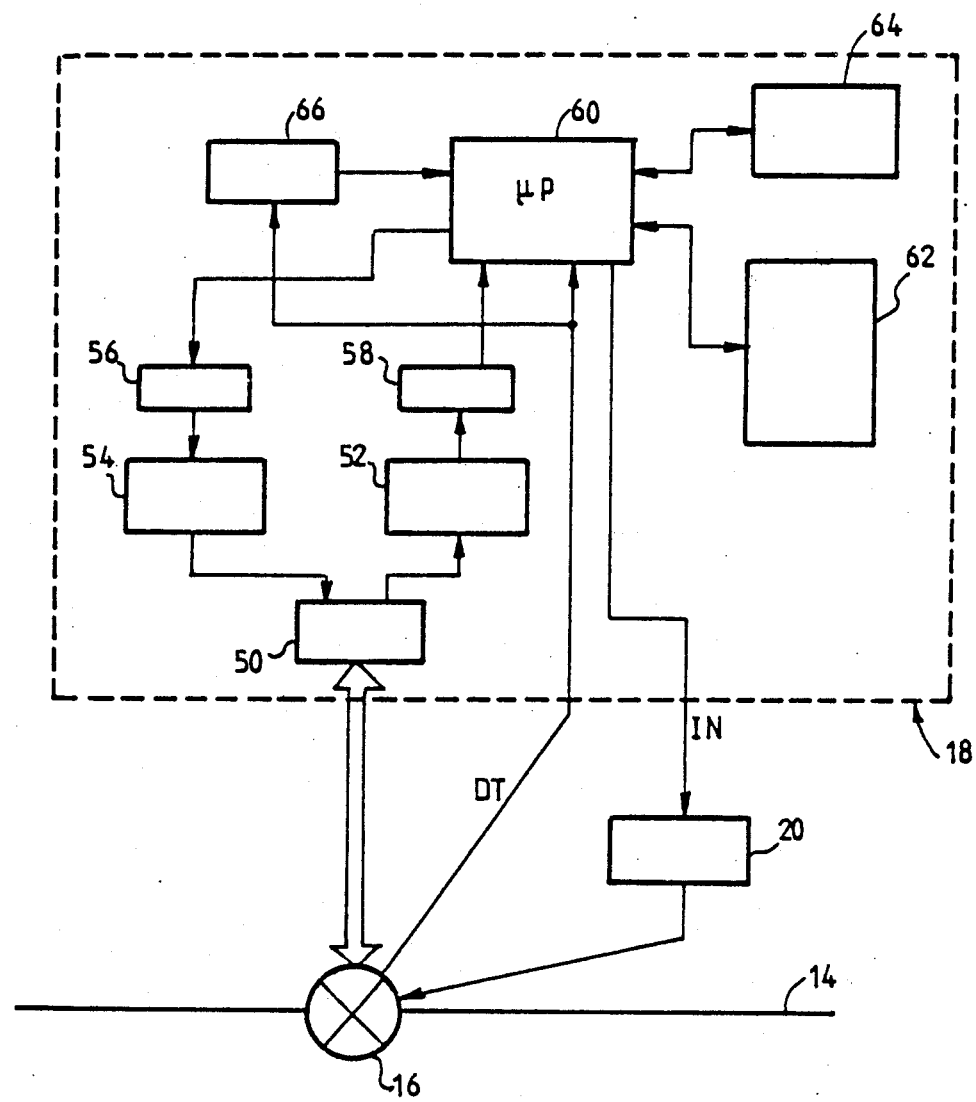
FIG. 3 shows the circuits of the monitoring device mounted on the telephone line in detail.

FIG. 3 shows the circuits of the monitoring device 18. It includes an input filter 50 which only passes authentication signals, i.e. signals having a frequency lying between 25 kHz and 35 kHz. The filter 50 is associated with a frequency analyser 52 and frequency generator 54. The generator 54 is controlled by an encoding circuit 56 while the output from the frequency analyser 52 is connected to a decoding circuit 58. The monitoring device 18 also includes a microprocessor 60 associated with a program and fixed data memory 62 and a writable volatile memory 64. The memory 62 contains subprograms necessary for implementing the algorithms ALG1 and ALG2, the public key RSA program, a comparison program COMP, together with the data $E_2$, D, and X associated with the RSA program. The device 18 finally includes a synchronizing circuit 66 which has the same function as the synchronizing circuit 48 of the circuit 12, which is tripped by the beginning of call charging signal DT being applied to its input.

The detailed operation of the authentication system is as follows. When the signal DT is applied to its input 22, the synchronizing circuit 48 of the circuit 12 emits an initializing pulse which starts an initial time interval $t_0$. During this time interval, the microprocessor 28 generates the value Y and transmits it to the monitoring device 18, and it also generates the initial magnitude $K_1$ on the basis of the value Z which it receives from the monitoring device 18. In order to do this, the microprocessor 28 calculates the number Y under the control of the RSA program stored in the memory 30 and on the basis of the public keys X and D and the value $E_1$ which are also stored in the memory 30. The encoding circuit 42 generates the eight corresponding four-digit numbers $n_i$. On the basis of these eight numbers $n_i$, the frequency generator 38 generates the corresponding eight frequencies $Y_i$ which are sent to the line 14 in order to be received by the monitoring device 18.

Symmetrically, on reception of the beginning of call charging signal DT, the monitoring device 18 generates eight frequencies $Z_i$ corresponding to the value Z of the RSA code and it sends them to the line 14 so as to enable them to be received by the circuit 12 of the telephone 2.

On receiving the frequencies $Z_i$, the frequency analyser 36 and the decoding circuit 46 generate the corresponding numbers $n_i$ and thus, finally, the number Z which is temporarily stored in the memory 32. The microcprocessor 28 then calculates the first initial value $K_1$ on the basis of the value Z and under the control of the RSA program, which value is then stored in the memory 32. Similarly, on receiving the frequencies $Y_i$, the monitoring device 18 uses a similar procedure for determining the value Y and calculating the initial value $K_1$ which is stored in its memory 64.

At the end of time interval $t_0$, the synchronizing circuits 48 and 66 emit new pulses. On receiving its pulse, the circuit 12 emis the first frequency $f_1^1$ and the second frequency $f_2^1$. On receiving these two frequencies, the monitoring device 18 stores them in its memory 64.

After a period of time T has elapsed, the synchronizing circuits 48 and 66 emit new clock pulses. When the microprocessor 28 of the circuit 12 receives its clock pulse, it calculates the second value $K_2$ of $K_i$ by implementing the algorithm ALG2, and the second value of the second frequency $f_2^2$ by implementing the algorithm ALG1. Simultaneously, the microprocessor 66 of the circuit 18 calculates the second value $K_2$ of $K_i$ and the second value of the second frequency $f_2^2$ by implementing the algorithms ALG1 and ALG2, and on the basis of the previously stored value $f_2^1$. When the monitoring device 18 receives the second value of the second frequency $f_2^2$, the microprocessor 60 under the control of the program COMP compares said value $f_2^2$ with the corresponding calculated value $f'_2^2$ to within a predetermined approximation. If these two approximate values are identical, then the call continues. At the following period T, the circuit 12 calculates second frequency value $f_2^3$ and the circuit 18 calculates second frequency value $f'_2^3$, and compares it with the received value $f_2^3$. This cycle continues until the circuit 12 receives the end of call signal FC, or until $f'_2^i$ is different from $f_2^i$. In this case, the microprocessor 60 generates an inhibit signal 20. This may be performed, for example, by means of a white noise generator which makes the line 14 unusable.

In greater detail, the operation of the system, taking a count of the approximation, is as follows:

On the basis of the frequency $f_2^{n-1}$ the microprocessor 28 calculates the value $f_2^n$ in two stages. Initially it implements algorithm ALG1 to calculate a number $p_2^n$. This number lies between 25,000 and 35,000 and is replaced by a value approximating $p_2^n$, said approximate value being $f_2^n$. The approximation is as follows:

Let x be the unit digits of the value $p_2^n$; if $0<x<5$, then $p_2^n$ is changed to $f_2^n$ by replacing x with 0 and retaining the tens digit, while if $5<x<9$, then $p_2^n$ is changed to $f_2^n$ by replacing x with 0 and replacing the tens digit with the immediately greater digit. In other words, $f_2^n$ is equal to $p_2^n$ rounded down to a whole number of tens if $x<5$, and rounded up to a whole number of tens if $x>5$.

The approximated frequency $f_2^n$ is transmitted over the line 14 by the frequency generator 38. During line transmission, this frequency may be slightly changed. The frequency analyser 52 therefore delivers a value $q_2^n$. The microprocessor 60 calculates the approximate value of $q_2^n$ by the above-described approximation technique, with the approximate value being written $g_2^n$. It will be understood that $g_2^n = f_2^n$.

The microprocessor 60 likewise calculates $f'_2^n$ in two stages. Initially the microprocessor calculates $v_2^n$ from $f'_2^{n-1}$ by implementing the algorithm ALG1. Thereafter, the microprocessor calculates the approximate value of $v_2^n$ which is $f'_2^n$ by the above-described technique. The values which are then compared by the comparison program COMP are the approximate values $f'_2^n$ and $g_2^n$, i.e. $f_2^n$.

Figure 4:
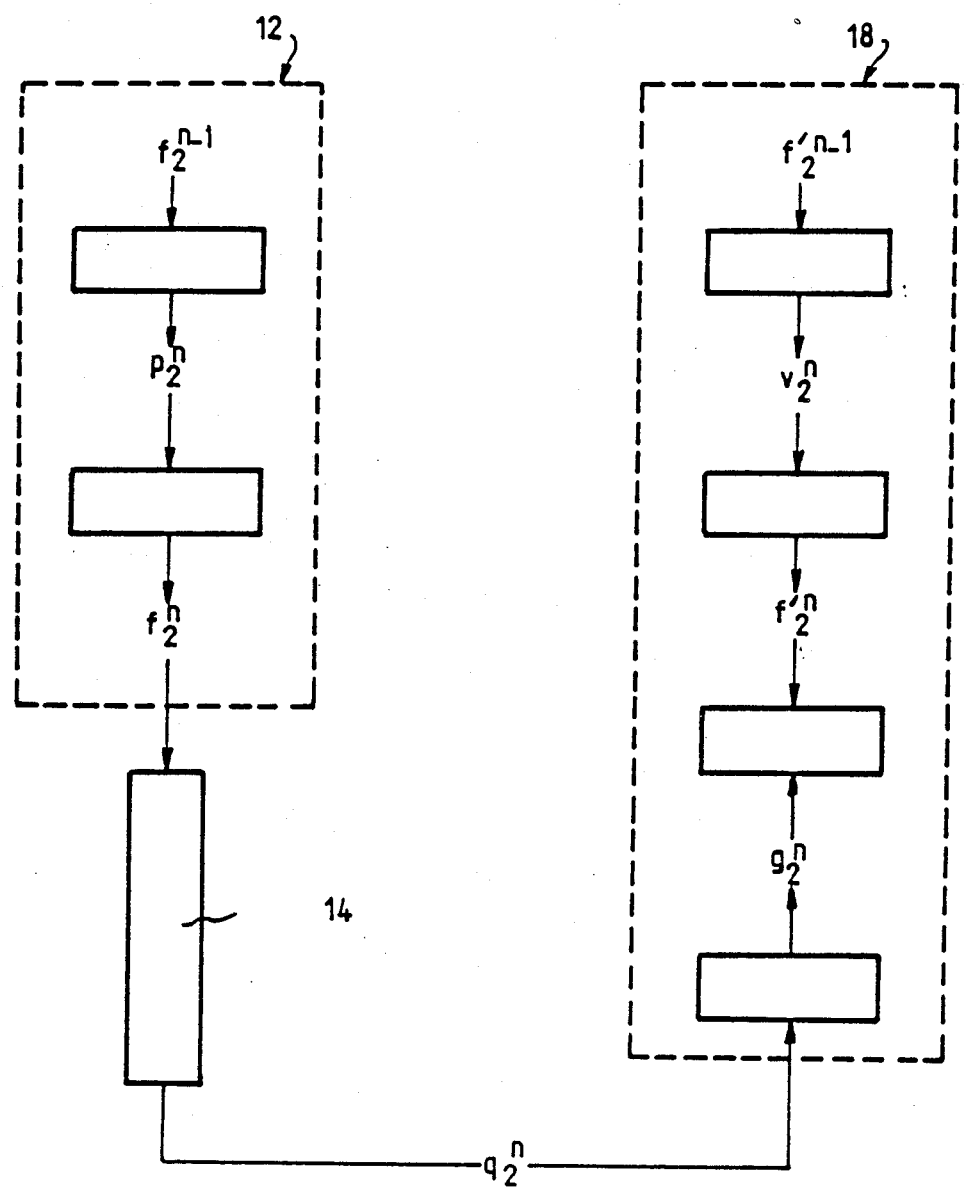
FIG. 4 shows a portion of the flow chart implemented for comparing the second frequencies.

FIG. 4 is a flow chart showing how the values $f_2^n$ and $f'_2^n$ are generated and how they are compared. In this figure, the term "Approx." refers to implementing the above-described approximation.

Naturally, instead of being implemented by portions of program in the microprocessors 28 and 60, the approximations could be implemented by special digital circuits including counters and comparators.

The above-described circuits are specific to call authentication, however, it is obvious that the telephone set 2 includes all of the conventional circuits required by a pre-payment and local charging telephone set. These circuits are well-known per se.

I claim:

1. A system for authenticating a call by analog frequency signals lying in a first or data range of frequencies between a transmitter/receiver terminal and a communications line, the system being characterized in that it further includes a monitoring device connected in said line, and in that:

said terminal includes means for generating authentication frequency signals in addition to said communications signals with a periodicity T while a call is in progress, said authentication signals having frequencies lying in a second frequency range, said authentication signals comprising, for each period, a fixed first signal $f_1^i$ characteristic of said terminal, and a variable second signal $f_2^i$;

said terminal and said monitoring device each including means for interchanging a first common value $K_1$ in the form of frequencies prior to a call being set up, means for implementing a common algorithm for generating respective second frequency values $f_2^i$ and $f'_2^i$ at each period T and depending at least on the preceding second frequency value, respectively $f_2^{i-1}$ and $f'_2^{i-1}$;

said terminal further including means for emitting said frequencies $f_1^i$ and $f_2^i$ at each period; and said monitoring device further including means for comparing each first frequency $f_1^i$ with predetermined first frequency values, and for comparing each received second frequency $f_2^i$ with the corresponding calculated second frequency $f'_2^i$, over a predetermined approximation range corresponding to line transmission, and means for inhibiting said call as a function of the results of said comparisons.

2. A system according to claim 1, characterized in that the means for implementing a common algorithm comprise means for implementing a first common algorithm ALG2 for defining initial values $K_{i-1}$ at each period, and means for implementing a second common algorithm ALG1 for generating respective second frequency values $f_2^1$ and $f'_2^i$ at each period depending on said initial value $K_i$ and on the value of the preceding second frequency value, $f_2^{i-1}$ and $f'_2^{i-1}$ respectively.

3. A system according to claim 2, characterized in that said terminal further includes means for generating, prior to setting up a call, a first second frequency value $f_2^1$, and in that said monitoring means further include means for storing said first second frequency value $f_2^1$.

4. A system according to claim 2, characterized in that said means for generating the second frequencies $f_2^n$ and $f'_2^n$ comprise, in addition to the means for implementing the second algorithm ALG1, means for forming an approximation to the exact value determined by said algorithm, and in that said comparison means compare the approximate value $f'_2^n$ generated by said monitoring device with an approximation to the value of the second frequency $f_2^n$ emitted by said terminal, as actually received by said monitoring device.

5. A system according to claim 1, characterized in that said first common value, $K_1$, is interchanged between said terminal and said monitoring means by implementing a public key code.

6. A system according to claim 2, characterized in that said first common value, $K_1$, is interchanged between said terminal and said monitoring means by implementing a public key code.

7. A system according to claim 3, characterized in that said first common value, $K_1$, is interchanged between said terminal and said monitoring means by implementing a public key code.

8. A system according to claim 1, characterized in that said terminal is a telephone set.

9. A system according to claim 2, characterized in that said terminal is a telephone set.

10. A system according to claim 3, characterized in that said terminal is a telephone set.

11. A system according to claim 4, characterized in that said terminal is a telephone set.

12. A system according to claim 5, characterized in that said terminal is a telephone set.

13. A system according to claim 6, characterized in that said terminal is a telephone set.

14. A system according to claim 7 characterized in that said terminal is a telephone set.

15. A system according to claim 8, characterized in that said telephone set is connected to said communications line.

16. A system according to claim 9, characterized in that said telephone set is connected to said communications line.

17. A system according to claim 10, characterized in that said telephone set is connected to said communications line.

18. A system according to claim 11, characterized in that said telephone set is connected to said communications line.

19. A system according to claim 12, characterized in that said telephone set is connected to said communications line.

20. A system according to claim 13, characterized in that said telephone set is connected to said communications line.

21. A system according to claim 14, characterized in that said telephone set is connected to said communications line.

* * * * *